United States Patent [19]

Doughty

[11] 4,065,135
[45] Dec. 27, 1977

[54] TURNTABLE FOR RECORD DISC

[76] Inventor: Robert L. Doughty, 36 Sylvan Ave., West Hartford, Conn. 06107

[21] Appl. No.: 697,197

[22] Filed: June 17, 1976

[51] Int. Cl.² .............................................. G11B 3/60
[52] U.S. Cl. ................................................. 274/39 R
[58] Field of Search ..................................... 274/39 R

[56] References Cited
U.S. PATENT DOCUMENTS

| 1,062,579 | 5/1913 | Aylsworth | 274/39 R |
| 3,608,909 | 9/1971 | Rabinow | 274/39 R |

Primary Examiner—Charles E. Phillips

Attorney, Agent, or Firm—McCormick, Paulding & Huber

[57] ABSTRACT

A grooved vinyl record disc is securely held in a turntable which includes an annular platen having a rigid, very flat upper surface. Air is evacuated from the underside of the disc, although the platen is impervious to air, by means of annular grooves adjacent the inner and outer edges of the platen and connected through passageways defined in the turntable structure, and through a rotary fluid coupling to communicate with a vacuum source. Resilient seals are provided for isolating the grooves on the underside of the record from ambient air, and these seals support the record disc so it can be flattened as it is drawn downwardly onto the platen by the application of vacuum.

5 Claims, 6 Drawing Figures

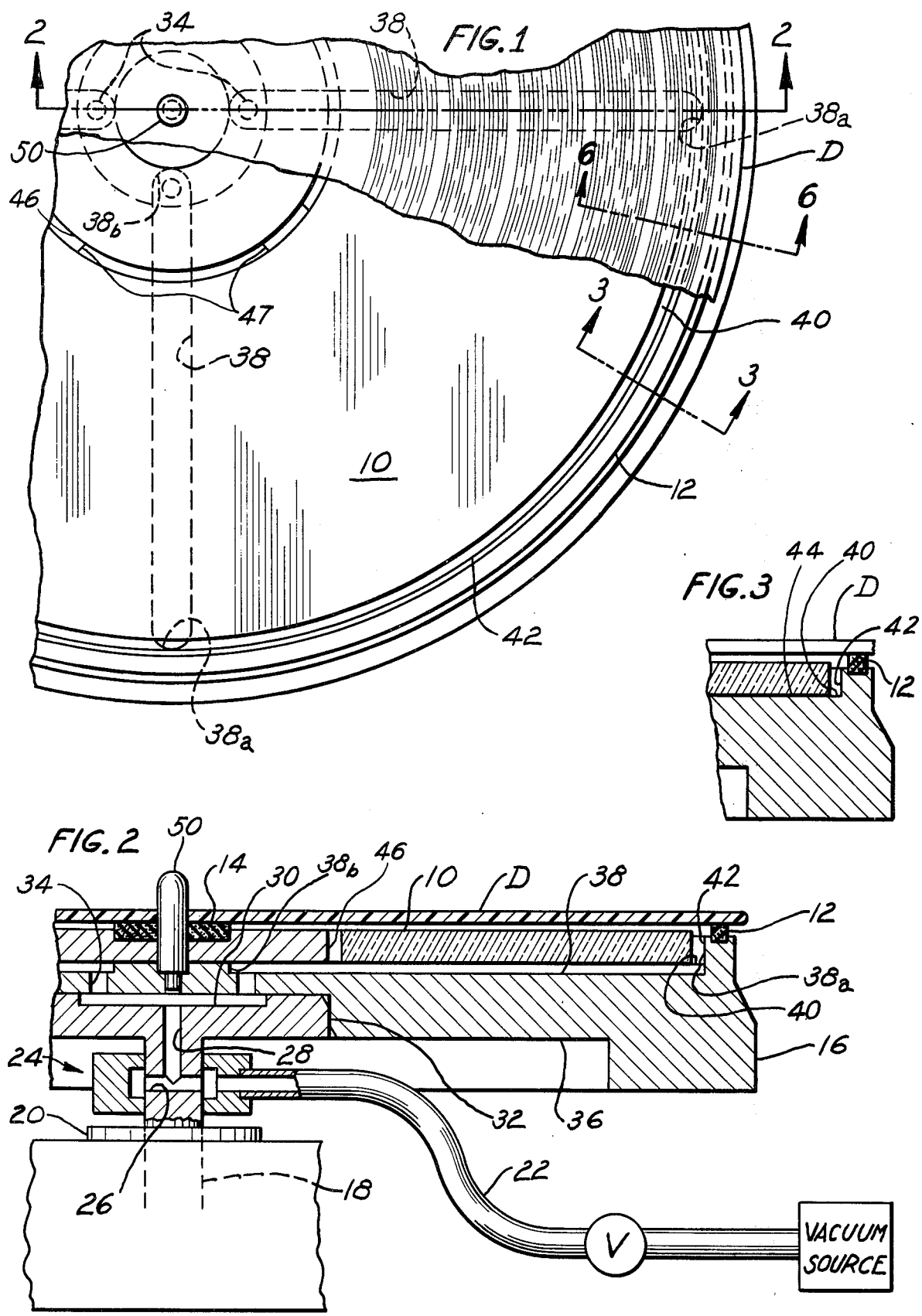

TURNTABLE FOR RECORD DISC

BACKGROUND OF THE INVENTION

This invention relates generally to a turntable for a record disc of the type used in reproducing sound in a high fidelity sound playback system.

High fidelity sound systems for reproducing music and voice from precision made vinyl record discs have attained a high degree of perfection. Distortion introduced by the components themselves, such as the pick-up and the electronics, are almost nonexistent. Speaker systems have also progressed to the point where they add very little undesirable characteristics of their own. The record disc itself has achieved a high degree of perfection in that the frequency response thereof is quite wide, distortion very low, dynamic range high, and surface noise very low.

Although these grooved vinyl record discs operate quite satisfactorily in present day high fidelity sound reproducing systems, one problem which has arisen relates to the fact that these discs do not always remain flat. Characteristic warping of these discs can take place either during the manufacture of the disc, during shipping or during storage. These discs may warp into a dish shape, develop saddles, or pinched areas, all of which cause some sort of up and down motion of the surface of the disc.

The stylus of the pick-up is usually cantilever mounted by a compliant suspension system from the body portion of the cartridge. A set tracking force causes a static deflection of the cantilever and stylus relative to the cartridge body. The vibration of the stylus, dictated by modulation of the record groove produces the vibration of the cantilever relative to the cartridge. This motion is amplified to be ultimately reproduced as the sound heard by the observer. The groove modulations are small and if the stylus tracks in a substantially horizontal plane the cartridge will remain at the statically deflected distance from the record disc surface. Large excursions of the stylus such as caused by warps will try to appreciably change the static deflection resulting in a change of force on the cartridge causing motion of the tone arm. Thus, a warped disc surface causes an up and down motion of the stylus other than that caused by the groove itself, and the tone arm and associated cartridge body will try to follow the stylus as it rides the warped surface.

Because the arm and the cartridge body have mass, the static deflection between the stylus and the cartridge body will necessarily change. A force vibrational situation will thereby be created between the arm, cartridge and stylus and the resonant frequency of the resulting structure will necessarily depend upon the compliance of the cartridge and the combined inertia of the arm and cartridge body. The warped disc can produce a forcing function at or near the natural frequency of the combined arm-cartridge-stylus system which will result in excessive displacement of the cartridge relative to the disc surface. This sort of unwanted vibration will cause a varying tracking force and in severe cases may cause the stylus to jump out of the groove or even cause the stylus to bottom out in its cantilever mount. Usually, these large excursions of the stylus occur at sub-audible frequencies, but modern electronic equipment and transducers can respond to such signals in a frequency range which can result in flutter of the speaker. The amplifier can thereby become overloaded, detracting from the power available for the signals which are being handled by the system.

The human ear is extremely sensitive to changes in pitch and to the rate of change in pitch. A change in pitch of the reproduced sound will occur if for any reason the velocity of the groove relative to the stylus varies from its intended velocity, as established during the cutting of the master disc from which the vinyl record disc is produced. During playback a varying platter speed, or an off-center hole in the record can both cause a mismatch between the playback and recorded velocity. Such varying platter speed can be reduced by good design of the drive system. Off-center holes in the record discs can be overcome by quality control procedures of the record manufacturer. However, the above-described tendency of vinyl record discs to warp produces a discrepency in this intended velocity of a disc with respect to the stylus which cannot be cured by present day production techniques or by design of the turntable drive system.

A warped surface of the playback disc causes the cartridge to be raised or lowered as it follows the warped surface. This action results in a pivoting of the arm, and regardless of the arm shape, or where the horizontal pivot is located, the stylus will "advance" or "return" relative to the direction of movement of a warped disc and thereby cause a change of pitch commonly known as vertical warp wow in the sound heard by the observer.

The forces which move the tone arm up and down as the stylus encounters a warped surface also causes a pivoting action of the cantilever relative to the cartridge which is not the result of groove modulation. This pivoting action takes place about a pivot which is at the vertical tracking angle from the stylus, 15° to 20°. Because this angle is relatively large, small deflections of the stylus relative to the cartridge body which are not caused by the groove modulations will result in the stylus "advancing" or "returning" relative to the direction of movement of the disc and thereby cause a change of pitch.

A warp can also be thought of as a cam surface which has a rise and fall. Tangents to the inflection points at the rise and fall are not level; and, therefore, if the disc is rotating at a constant angular velocity the linear velocity of the groove relative to the stylus is increased by a function of the cosine of the angle of these tangents to the level surface. With warps of short duration these angles can be quite significant. Also the surface of the record can be stretched or compressed, depending on the radius of curvature, at various points of the warped surface. This can also result in a change of pitch because the modulations are either gathered together or stretched farther apart.

All these various forms of pitch change due to record warp can occur simultaneously. In some cases the deleterious effects will complement one another leading to readily detectable pitch changes, and in other cases might tend to cancel one another depending upon the type of warp and the geometry of the tone arm and the dynamics of the system. Depending upon the type of tone arm used in a particular turntable structure the up and down motion of the tone arm might also result in corresponding "in" and "out" motion of the tone arm relative to the center of the disc. This sort of motion will cause the tracking force on the side walls of the record groove to vary, thereby to a sideward swaying of the tone arm and possible distortion of the sound produced by the system.

The chief aim of the present invention is to provide a turntable that flattens the warped record disc while the record disc is being played in a present day high fidelity sound reproduction system. This flattening of the record disc is accomplished by applying vacuum to the underside of the disc while the disc is supported in the area opposite that portion of the record being engaged by the stylus. More particularly, the record is supported on an uninterrupted flat surface defined by a platen which preferably comprises an annular plate glass segment supported in the turntable structure for rotation, and provided with evacuated areas adjacent its inner and outer peripheries.

Another advantage of the present invention is in the provision of a rigid back-up surface for the record disc being played such that "needle talk" is reduced. The reduction in "needle talk" is achieved as a result of supporting the record disc uniformly across its entire underside rather than merely supporting the disc adjacent its periphery or in certain limited areas such that the vinyl record disc tends to act as a sounding board or the like which interferes with transferring the groove modulations to the pick-up stylus. As a result of firmly anchoring the record disc against the rigid and comparatively massive platen a "cleaner" and less distorted sound is produced in a system incorporating a turntable constructed in accordance with the present invention.

Still another advantage of the present invention is the elimination of the complaint elastomeric surface sometimes utilized in turntable platters which surfaces cannot support a warped record in a flat condition because of the fact that the resiliency of the record itself will cause distortions in the underlying complaint supporting surface of the platter. Although the application of a vacuum to such a complaint or elastomeric platter surface will yield a certain degree of flattening in the disc, it is an important feature of the present invention that the disc is absolutely flattened against the rigid, flat platen surface in such a way that the only variation to the flatness of the upper surface of the record disc is caused by variations in the thickness along circumferential lines of the record disc itself. Needless to say, these sort of variations in the flatness of the upper surface of the record disc can be made insignificant by proper production control of the record manufacturer.

A still further advantage of the present invention is the provision of a flat uninterrupted surface of the platen which supports the record disc such that no cavities or holes are provided in the surface, and yet a vacuum is provided for drawing the record disc against the platen surface to flatten out the record disc and thereby eliminate any warping thereof. As a result of the lack of holes or pores or the like in the platen surface, it will be apparent that the surface is more readily cleaned than would be the cause with a porous or partially compliant platter surface of the type available heretofore.

SUMMARY OF THE INVENTION

A turntable is provided for flattening phonographic record discs of the type having grooves formed in both sides thereof, said turntable comprising resilient support means adjacent the periphery, and the center portion of the disc, with an air impervious platen being provided between these resilient disc engaging means and spaced slightly below the underside of the disc when the disc is so supported. A source of vacuum is connected through a fluid coupling to internal passageways in a turntable structure such that the air can be evacuated from beneath the record disc, and the record flattened out on that flat rigid platen. The air from the underside of the flattened disc is continuously exhausted by means of the groove in the underside of the disc. No holes or openings are provided in the platen, with the result that the turntable structure is adapted to be easily cleaned, and the resilient record disc, usually fabricated of vinyl material, does not become deformed as a result of such openings in the portion of the turntable engaging the groove in the underside of the disc.

BRIEF DESCRIPTION OF DRAWINGS

FIG. 1 is a fragmentary plan view of a turntable constructed in accordance with the present invention.

FIG. 2 is a sectional view taken generally on the line 2—2 of FIG. 1.

FIG. 3 is a sectional view taken generally on the line 3—3 of FIG. 1.

DESCRIPTION OF PREFERRED EMBODIMENT

Turning now to the drawings in greater detail, the high fidelity sound recording disc D is illustrated in all of the various views and comprises a cast vinyl product having grooves formed in both its upper and lower surface, which grooves are adapted to impart vibration to a stylus (not shown) of the type which is typically cantilever mounted from a cartridge body (not shown) held in a tone arm (not shown) in a typical turntable installation. The stylus is adapted to track the spirally-shaped groove in the record disc D as the record disc is rotated on the turntable structure to be described. In spite of elaborate production control techniques and the effort of all the record companies to provide discs which are flat, these vinyl discs do tend to warp to some degree not only during manufacture, but also during storage and over the relatively long period of time during which they are used by the listener. A warped record disc causes the tone arm to undulate in an attempt to follow the curved surface of the record. The undulation of the arm requires a changing tracking force from the stylus and cantilever assembly which is undersirable regardless of the degree of compliance designed into the stylus. Warped records are responsible for the "wow" defect produced in the resulting sound from a high fidelity sound system, and for such effects on the recorded sound which usually result in pitch changes as described previously. These effects cannot be completely eliminated by low arm inertia or geometry. Exitation frequencies encountered as a result of the warped record which are at or near the natural frequency of the arm-cartridge stylus assembly can cause excessive power loss in the base region of the frequency spectrum in which the sound system is operating. The turntable structure to be described seeks to flatten the record disc in such a way that wow and any resulting intermodulation distortion is eliminated. Superior sound reproduction is achieved by virtue of the face that the record disc is flattened on the turntable while it is being played, and also by virtue of the fact that the relatively flexible vinyl record is securely clamped against a very flat surface defined by a platen mounted in the turntable structure for this purpose.

Figure 6:
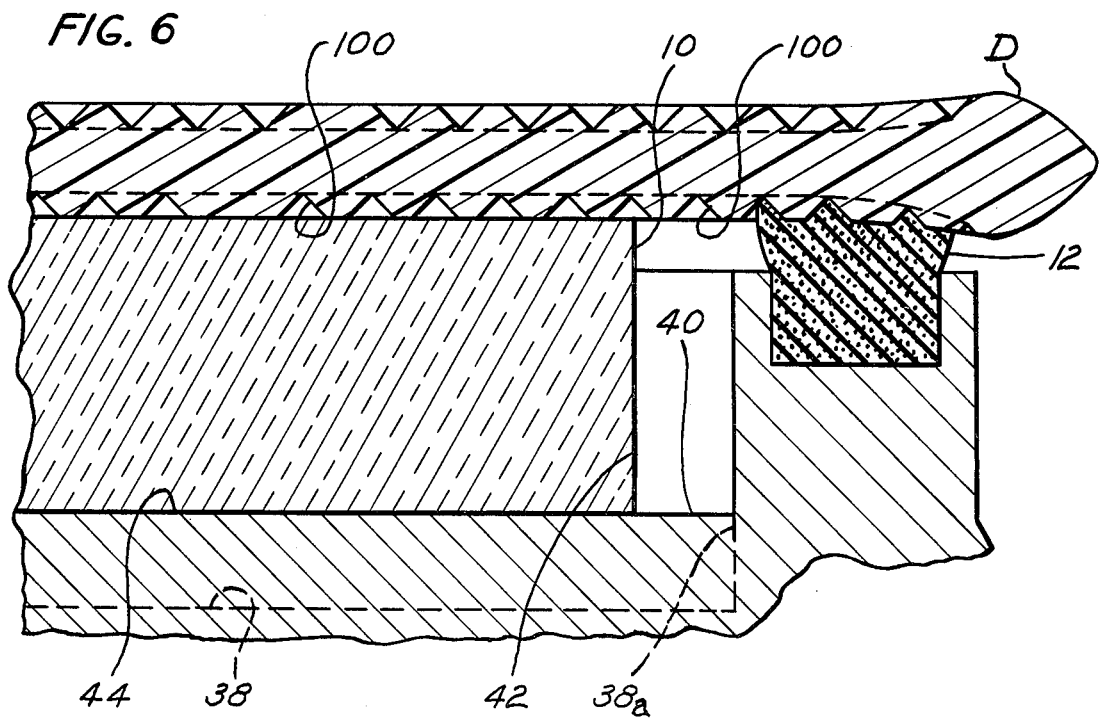
FIG. 6 is a sectional view taken generally on the line 6—6 of the FIG. 1 embodiment, but is also characteristic of the FIG. 4 embodiment.

As best shown in FIG. 1 the platen 10 comprises a flat annulus preferably fabricated of plate glass so that its upper surface is optically flat, and it is an important feature of the present invention that this flat upper surface of the platen has no openings or grooves, and that the entire flat upper surface of the platen will engage the underside of the record disc D throughout a major portion of the groove defining portion of the record disc as best shown in FIG. 6. FIG. 2 shows the record disc D spaced slightly above the surface of the platen 10 in a preliminary or first position wherein the disc is supported by resilient means 12 and 14, adjacent the outer periphery, and the center portion respectively, of the disc D and cooperating with the disc to define a seal which will permit the air between the underside of the disc D and the upper surface of the platen 10 to be withdrawn through suitable internal passageways defined for this purpose in the turntable structure in order to clamp the record disc D against the upper surface of the platen 10 effectively pulling said disc downwardly from the FIG. 2 position to that suggested in FIG. 6.

The turntable structure for supporting the platen and the resilient support, or means 12 and 14, described above may be fabricated from any conveniently cast or machined metal such as aluminum or the like and may be driven by any suitable means, as for example by a belt drive applied to the area indicated generally at 16 in FIG. 2, or by a direct drive associated with the depending shaft portion of the turntable structure, indicated generally at 18 in FIG. 2. Means is provided for rotatably supporting the turntable structure, and more particularly for supporting the shaft 18, and said means comprises a conventional housing indicated generally at 20 which housing comprises conventional structure which need not be described in great detail herein.

Still with reference to FIG. 2, a source of vacuum communicates through a line 22 with a rotary fluid coupling 24, providing communication between internal passageways defined in the turntable structure and the vacuum source. A valve V may be provided in the line 22 for controlling the application of vacuum to the turntable structure. It is further noted that this valve V is preferably a three way valve to provide for venting the internal passageways to atmospheric pressure when the vacuum is turned off. The fluid coupling 24 comprises a fixed part connected to the line 22, and a rotating part defined by the shaft 18 and including internal passageways indicated generally at 26 and 28 in FIG. 2. In the embodiment shown in FIG. 2, the axially extending passageway 28 defined in the shaft 18 of the turntable structure can be seen to communicate with a recess 30 provided in the upwardly facing end of a flanged portion 32 of the shaft defining portion 18 of the turntable structure. Drilled openings 34, are provided in the turntable surface 36 so as to provide communication between the recess 30 and radially extending grooves 38, 38 defined in the floor of a cavity of annular shape adapted to receive the platen annulus.

The outer ends of the radially extending grooves 38, 38 communicate with annular opening means associated with the outer peripheral edge of the platen 10, and the inner radial end 38b of each radially extending groove 38 communicates with one of the drilled openings 34 in the turntable structure in order to permit exhausting of the air in the space between the record disc D and the platen 10, not only when the disc is supported on the resilient support means 12 and 14, but also after the disc has been clamped against the flat upper surface of the platen 10. The groove in the underside of the record disc D, best shown in FIG. 6, serves to achieve this clamping force after the disc D has been so flattened.

Turning next to a more complete description of the annular opening means associated with the outer periphery of the platen 10, said annular opening means is more particularly defined by a shallow upwardly opened groove 40 defined in the turntable structure 36, as best shown in FIG. 3. This groove 40 is located inwardly of the annular support seal 12 which engages the outer rim portion of the record disc D, and more particularly between a vertically extending side wall 42 of the cavity and the platen 10. Thus, the platen cavity 44 has a generally flat floor adapted to receive the bottom side of the platen 10, which covers the grooves 38, 38 extending radially across the annular cavity floor. The grooves 38, 38 are defined in part by the turntable structure 36 and in part by the underside of the platen 10. FIG. 2, being a sectional view taken generally radially through one of these grooves 38, illustrates the communication between the outer end of said groove 38 and the annular opening means or slot 40. The slot is upwardly open and provides commnication between the underside of the record disc D and the internal passageways of the turntable structure for withdrawing air from the space between the underside of the disc and the platen 10, not only when the disc is supported in its first or preliminary position as depicted in FIG. 2, but also when the disc has been flattened as shown in FIG. 6.

Further opening means, in the form of an annular slot 46 is provided adjacent the center portion of the record disc, that is, adjacent the label portion of the record disc, and this slot 46 communicates with the radially extending grooves 38, 38 as well as with the space between the underside of the record disc D and the upper surface of the platen 10 so as to facilitate the withdrawal of air from this region as the record disc is drawn downwardly against the platen 10 as best shown in FIG. 6. The inner peripheral edge of the platen 10 cooperates with the platen cavity defining portion of the turntable structure to define this slot 46 but the platen 10 is actually located radially in the turntable structure by means of spacers 47 located either in the inner or the outer slots. As shown in FIG. 1, these spacers are located in the slot 46, but it will be apparent that spacers might instead be provided in the outer slot 40.

Still with reference to the turntable structure, a record disc locator pin, or spindle 50, is provided in a central opening provided for this purpose in the turntable structure, and the pin 50 also extends upwardly through an opening in the central resilient seal and support member 14 so as to be received in the central opening of the record disc D as shown in FIG. 2. The inner and outer resilient support means, 14 and 12 repectively, preferably comprise a closed cellular material of sponge-like consistency well adapted to be compressed by the record disc D when vacuum pressure (at 6 inches of mercury) is applied. Such material is available from several sources, such as for example, American Sponge's closed cell material No. 4211-N; and Rubatex Corporation vinyl closed cell material, No. R-320-V. FIG. 6 shows the deformation of the seal material at the edge of the record disc, and more particularly how the material fills the lead-in groove portion of the "microgroove" upon which the sound is recorded. FIG. 6 shows the record disc D securely held against the upper surface of the platen 10, and also shows the continuous groove 100 on the underside of the disc whereby air is continuously withdrawn from between the disc D and the platen 10 and through the annular slot 40 and into the outer radial end portion of the groove 38a and thence into the passageways defined for this purpose in the turntable structure.

Figure 4:
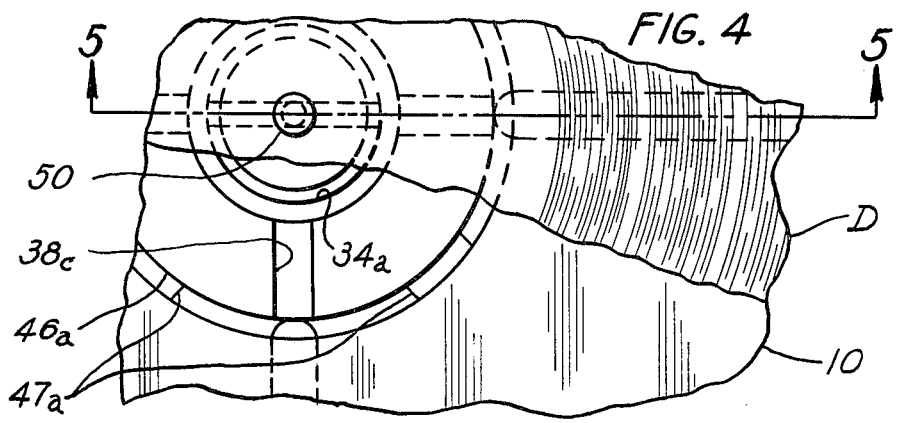
FIG. 4 is a fragmentary plan view of an alternative embodiment of the present invention.
Figure 5:
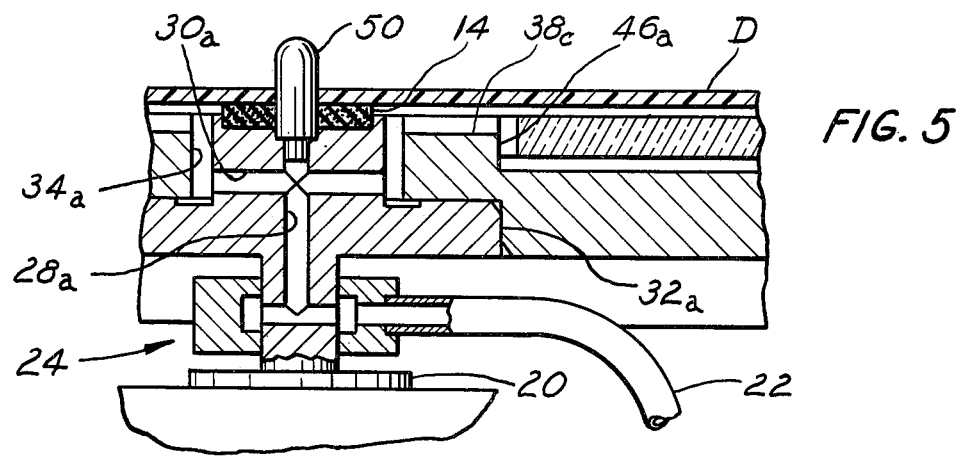
FIG. 5 is a sectional view taken generally on the line 5—5 of FIG. 4.

FIGS. 4 and 5 shows a turntable structure similar to that described hereinabove with reference to FIGS. 1, 2, 3 and 6 except that the internal passageways defined in the turntable structure are slightly differently configured in that the turntable structure is fabricated from only two parts instead of the three parts depicted for it in FIG. 2. The central support shaft member 32a extends upwardly to the top of the platter portion of the turntable and receives the central seal member 14 at is upper end in the version shown in FIGS. 4 and 5. Thus, the axially extending passageway 28a communicates with an annular slot 34a through cross passageways 30a, and short radially extending grooves 38c communicating with the slot 34a and with the inner annular opening means defined by the slot 46a. The turntable structure of FIGS. 4 and 5 is otherwise similar to that described above with reference to FIGS. 1-3 inclusively, and as mentioned previously, FIG. 6 is intended to be typical of both the FIGS. 1-3 and the FIGS. 4 and 5 embodiments.

I claim:

1. A turntable for relatively thin flexible phonographic record disc having recording grooves formed in both sides thereof, said turntable having a center locating pin and resilient means surrounding said locating pin, annular resilient means supporting the disc adjacent its periphery, an annular platen of inflexible impervious material having a flat rigid uninterrupted upper surface spaced below the underside of the flexible record disc when the disc is in a first position supported by said resilient means, a source of vacuum, turntable structure defining an annular cavity of greater radial extent than that of said annular platen and having a floor supporting said inflexible impervious platen, and said turntable structure defining internal passageways which communicate with radially extending grooves in the floor of said annular cavity, means rotatably supporting said turntable structure, fluid coupling means providing communication between said internal passageways defined by said turntable structure and said vacuum source, said turntable structure cavity having an outer wall defining annular opening means between said cavity wall and the outer periphery of said annular platen, and said internal passageways and radial grooves providing communication between said vacuum source and said annular opening means, vacuum at said opening means being adapted to draw the disc downwardly compressing both said resilient means until the underside of the disc abuts said flat rigid upper surface of said inflexible impervious platen.

2. The turntable defined in claim 1 wherein said annular resilient means supporting the record disc adjacent its periphery comprises an annular seal of sponge-like material having a closed celllular structure to prevent air from passing therethrough and to provide an air impervious seal between it and the underside of the grooved disc.

3. The turntable defined in claim 1 further characterized by an inner annular opening means adjacent the inner periphery of said platen and defined between the radially inner wall of said cavity and the inner periphery of said platen, said inner opening means communicating with said radially extending grooves to assist in drawing the disc downwardly against said flat upper surface of said platen.

4. The turntable defined in claim 1 further characterized by spacers in said inner annular opening means to restrain said platen from movement radially in said cavity between said inner and outer cavity walls.

5. The turntable defined in claim 1 wherein said platen is made of glass.

* * * * *

UNITED STATES PATENT OFFICE
CERTIFICATE OF CORRECTION

Patent No. 4,065,135   Dated December 27, 1977

Inventor(s) Robert L. Doughty

It is certified that error appears in the above-identified patent and that said Letters Patent are hereby corrected as shown below:

Col. 3, line 32, "complaint" should be --compliant--.

Col. 3, line 35, "complaint" should be --compliant--.

Col. 3, line 37, "complaint" should be --compliant--.

Col. 4, line 67, "face" should be --fact--.

Col. 5, line 58, "34, are" should be --34, 34 are--.

Col. 5, line 59, "surface" should be --structure--.

Col. 7, line 11, "shows" should be --show--.

Col. 7, line 19, "is" should be --its--.

Col. 8, line 23, "celllular" should be --cellular--.

Signed and Sealed this

Eighteenth Day of April 1978

[SEAL]

Attest:

RUTH C. MASON
Attesting Officer

LUTRELLE F. PARKER
Acting Commissioner of Patents and Trademarks